United States Patent [19]
Fertik

[11] 3,860,407
[45] Jan. 14, 1975

[54] CONTROL SYSTEM FOR MOLD COOLING IN GLASS FORMING MACHINE

[75] Inventor: Harry A. Fertik, Philadelphia, Pa.

[73] Assignee: Leeds & Northrup Company, North Wales, Pa.

[22] Filed: June 18, 1973

[21] Appl. No.: 371,098

[52] U.S. Cl. .......................... 65/161, 65/29, 65/162
[51] Int. Cl. ............................................. C03b 25/04
[58] Field of Search ......... 65/29, 161, 162, DIG. 13

[56] References Cited
UNITED STATES PATENTS
3,416,908  12/1968  Goodwin et al. ..................... 65/162

Primary Examiner—Arthur D. Kellogg
Attorney, Agent, or Firm—William G. Miller, Jr.; Raymond F. MacKay

[57] ABSTRACT

There is disclosed a system for controlling the cooling of the molds in a glass forming machine which involves compensating the pressure set point for the control of the cooling air to correct for changes in the temperature of the cooling air and changes in the mass flow rate of the glass.

2 Claims, 1 Drawing Figure

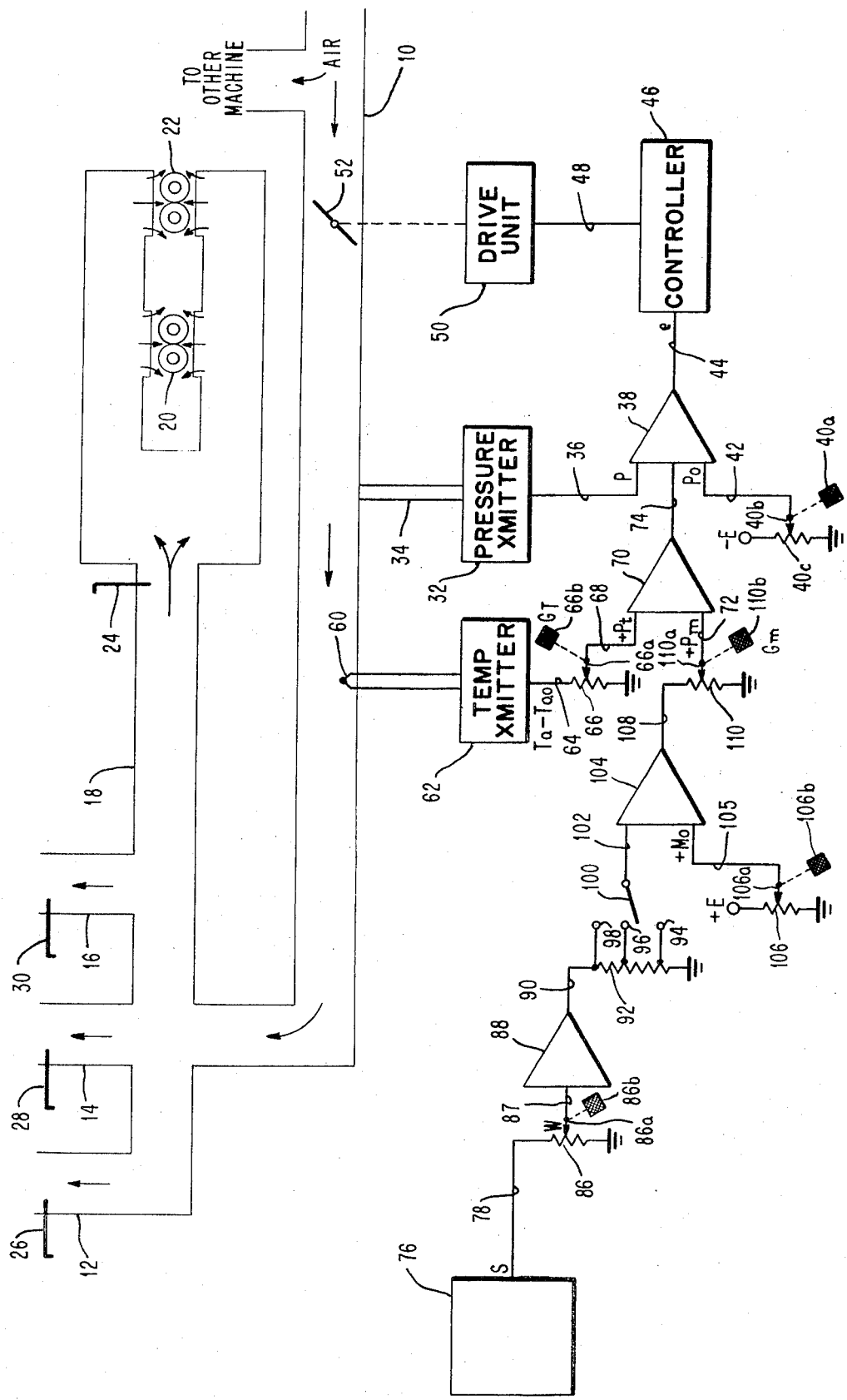

3,860,407

CONTROL SYSTEM FOR MOLD COOLING IN GLASS FORMING MACHINE

BACKGROUND OF THE INVENTION

This invention relates to a method and apparatus for the manufacture of glass articles and more particularly to control means for automatically maintaining a relatively constant parison temperature.

One of the most common methods for manufacturing glass articles such as bottles, jars and similar containers is by means of blowing machines which take successive gobs of glass as they are sheared from the outlet of a glass feeder. Those gobs are first fed to blank molds where there is formed the parison, then after the parison is formed the individual blanks or parisons are automatically transferred to blow molds where they are blown to final form. At each of the positions in the bottle production process, that is, both where the parison is formed and where the bottle is blown, there are orifices positioned on both sides of the molds so that air is blown onto both sides of the molds thus cooling the molds and the glass in the molds. It is well known that the temperature in the glass parison at the time of blowing affects the distribution of glass in the blowing of the article. It is therefore advantageous to maintain as constant as possible the temperature distribution of the parison as by maintaining the temperature at a particular point on the parison in the production of the successive parisons so that optimum bowing occurs. This temperature may be referred to simply as the parison temperature, it being understood that such a reference relates to the temperature at a fixed point on the parison at a particular time in each successive formation of a parison.

It will be understood that the air cooling system supplying the air to the orifices for the cooling of the parison is normally common for a number of sections of a glass forming machine and sometimes common to several machines. Thus, the main duct which supplies the air branches off to the several sections of each machine. Certain branches of the cooling system for one machine are at times shut off and at other times all of the branches to one of the machines may be shut off, for example, when that particular machine is shut down. In either case the available number of openings allowing air flow will be varied and this variation can have a wide range, as when a whole machine is shut down. Such variations in the number of outlets in the cooling system will naturally cause a variation in the pressure of the system so that the amount of cooling air flowing from the remaining orifices will vary unless the cooling system is subject to pressure control as by the adjustment of the total air flow in the system.

Normally, the air used in cooling is ambient air and therefore, the cooling effect of the air is subject to change for reasons other than the change in the rate of flow resulting from closing some orifices. For example, the temperature of the air may vary over a wide range and in some cases variations in the humidity may also be significant. Since the temperature, for example, can change significantly and since it affects the cooling properties of the air, it is desirable to compensate for change in temperature.

Other factors which influence the temperature of the parison include the average rate of heat input to the molds from the glass being supplied to the molds. A change in the rate of heat input may result, for example, from a change in the mass flow of the glass due to an increased rate of production, that is, an increased number of gobs per minute, or an increased weight per gob of glass, or from an increase in the temperature of the gob as it is supplied to the blank mold. It is necessary when there is a variation of the heat input to the molds to modify the flow of cooling air in order to maintain a constant parison temperature.

Both the changes in the cooling effect of the air and the changes in the average rate of heat input may be considered to be disturbances to the heat transfer equilibrium maintaining the parison temperature. After such a disturbance it is, of course, desirable that a new equilibrium condition be established to provide the desired parison temperature.

Prior art systems have attempted to maintain the temperature of the parison constant by measuring the temperature of the parison as closely as possible and by varying the air flow in response to changes in the parison temperature so as to tend to maintain it constant. Thus, the prior art systems have relied upon direct measurements and feedback control as a basis for controlling the temperature. Such direct measurements are difficult to make with any degree of accuracy under conditions such as exist in glass forming machines. Therefore, it is desirable to control the temperature of the parisons without using a direct temperature measurement. It is therefore, an object of this invention to provide an improved temperature control system for parisons and more particularly to provide a control system which does not require a direct measurement of the parison itself.

SUMMARY OF THE INVENTION

In carrying out the invention there is provided a control system for maintaining a constant temperature for the parisons by an air cooling system blowing air across the molds of a glass forming machine. this constant temperature is maintained in the face of variations in the heat transfer equilibrium between the air cooling system and the parisons by a control system which includes a means responsive to the pressure of the cooling air in the ducts for controlling the pressure to a set point value. In addition, the system includes means responsive to changes in the heat transfer equilibrium for modifying the pressure control in accordance with the equilibrium changes so as to cause the pressure control to maintain the desired constant temperature of the parisons as the equilibrium changes.

BRIEF DESCRIPTION OF THE DRAWING

The single FIGURE of this application shows a control system, partially in block diagram form, for controlling the cooling of the molds in a glass forming machine.

DESCRIPTION OF THE PREFERRED EMBODIMENTS

There is shown in the FIGURE a diagrammatic sketch of the cooling system of a glass forming machine wherein the cooling system includes means for supplying ambient air into the main duct 10 which then supplies the various branches 12, 14, 16 and 18 with cooling air for the separate sections of the machine. The air supplied to each of the branches is then directed on the blank molds and the blow molds of each of the machine sections. For example, the air flowing in branch 18 is directed through orifices at the pair of blank molds 20 where the parisons are formed. The air is also directed by orifices at both sides of the pair of blow molds 22 where the bottles are blown. As previously mentioned, it is desirable to keep the temperature of the parisons constant regardless of variations in the heat transfer equilibrium between the cooling system and the parisons as will occur, for example, when there is a change in temperature in the air supplied to main duct 10 which changes the cooling properties of the air and also when changes are made in the rate of production or the weight of the bottle produced by the machine, both of which affect the mass flow rate of glass to the machine. All of these changes require modification in the air flow directed at the molds in order to maintain a constant temperature for the parison.

Each of the branches 12, 14, 16 and 18 will normally include a shut-off of some type such as, for example, a slide 24, as shown in the branch 18, and similar slides 26, 28 and 30 in the respective branches 12, 14 and 16. It will be evident that when the cooling air in branch 12 is blocked by the slide 26 to prevent the air flow in branch 12, the result is an increase in air flow in the other braches. In order to prevent such air flow changes and hence changes in the cooling effect whenever a particular branch is blocked, there is provided a pressure control system in the main duct 10 which includes a pressure transmitter 32 connected to the duct 10 by the pipe 34 for measuring the static pressure in the duct 10 and for producing on the output line 36 a signal P proportional to the pressure. The signal on line 36 is compared in the operational amplifier 38 with the signal $P_o$ which represents the set point for the pressure in the duct 10. As shown in the figure the signal $P_o$ is determined by the adjustment of knob 40a which moves contact 40b on potentiometer slide-wire 40c with the slidewire 40c being supplied with a potential +E.

Any deviation between P represented by the signal on line 36 and $P_o$ represented by the signal on line 42 is effective to produce an error signal e on line 44 as an input to controller 46. The controller 46 may be any one of a number of standard controllers providing proportional and integral control functions. for example, controller 46 may have a circuit similar to that shown in U.S. Pat. No. 3,693,067, issued to Thomas J. Walsh on Sept. 19, 1972. The controller 46 produces an output signal on line 48 to drive unit 50 so as to cause the drive unit to position the butterfly valve 52 in the duct 10 in direction and extent to modify the pressure in the duct 10 as detected by the pressure transmitter 32 so as to change it to a value equal to the set point $P_o$. This pressure control system as descried above will be adequate to maintain a consistent cooling of the molds in situations in which a branch of the cooling system is blocked as when a change in mold equipment is made or when a machine is shut down.

It has been found that among the variations in cooling properties of the air, variation in the temperature of ambient air supplied to the main duct 10 has a significant adverse effect on the consistency of the cooling of the molds and it is hence desirable that this variation be compensated by a change in the air flow from the orifices. To that end the temperature of the air in the duct 10 is measured by a temperature sensing element 60 which may be a thermocouple and which supplies to a temperature transmitter 62 a potential related to the temperature of the air in the duct 10. The temperature transmitter 62 then supplies on its output line 64 a signal $T_a - T_{ao}$ which represents the temperature measured by the thermocouple 60 minus a reference temperature $T_{ao}$ so that the signal on line 64 may, under normal temperature conditions, be close to zero or at zero. It is, of course, understood that the signal on 64 may represent only $T_a$. Any potential on line 64 appears across the potentiometer 66 whose contact 66a is adjusted by the knob 66b to insert a calibrated factor $G_t$ so that the signal $P_t$ on line 68, which is supplied as an input to operational amplifier 70, is proportional to the deviation of the temperature in the duct 10 from its normal value with the proportionality being determined by the value $G_t$. The value of $G_t$ is adjusted so that the parison temperature, under steady state conditions, does not change with the ambient temperature as measured by thermocouple 60.

Ignoring for the moment the amplifier input on line 72, it will be evident that the signal on line 68 into amplifier 70 will provide on the output line 74 a signal which forms a third input to amplifier 38 which is effective to modify the deviation or error signal on line 44 to controller 46. The signal one line 74 is added to the set point $P_o$ for the pressure control loop so that the pressure control is effectively modified to cause a change in the air flow from the orifices to the molds 20 and 22 in compensation for changes in temperature as detected by the thermocouple 60.

Field data has indicated that for double gobbed 6.5 oz. and 7.5 oz. containers the value of $G_t$ is on the order of 0.16 inch $H_2O$/°F, for example.

In the normal installation it will be necessary in calibrating $G_t$ to measure a limited number of parison temperatures (the glass parison temperature may be measured by a high speed glass surface radiation pyrometer). The first of two calibrating tests is to manipulate the pressure set point in certain steps over a range of pressure where a bottle can be formed while recording the parison temperature and pressure. The proportionality factor of $G_t$ is set to zero during this test. About 15 minutes should be allowed to each pressure level to achieve equilibrium. Next, the pressure set point should be adjusted to the value that yielded the best quality container and the job is run over a 12 hour period, for example, in order to include the high and low ambient temperature extremes. The proportionality factor $G_t$ is set to zero for the test, also. Normally, readings made every half hour of the parison temperature are sufficient, and data which is taken when the mold is changed is rejected.

The data from both experiments can be plotted and a best fit line drawn to the data. To obtain $G_t$ the slope of the relationship between the parison temperature and the air temperature is divided by the slope of the relationship between the parison temperature and the static air pressure in the main duct.

It will be evident to those skilled in the art that the circuit of the figure is only one configuration which may be used to carry out the computation $$P_t = G_t(T_a - T_{ao}).$$

When the setting on potentiometer 66 by positioning of the slide 66a is in accordance with $G_t$ calibrated as above, the mold cooling control system described is ready for continuous operation on a variety of containers. If, however, there is significant change in the average rate of heat input to the machine due to changes in the gob weight, machine speed or gob temperature in the blank, a compensatory signal may be utilized, for example, on line 72. One line 72 there is provided a feedforward signal which will compensate for changes in machine speed to increase production or decrease production as well as changes in gob weight.

To provide the feedforward signal on line 72 there is supplied a signal on line 78 from block 76 which is a function of the speed of the machine in cuts per minute which may be determined in any of a number of ways depending on what signals are available from the machine representing its speed. Thus, the signal on line 78 is proportional to the number of cuts per minute.

The signal on line 78 supplies the potential across linear slidewire 86 whose tap 86a is adjusted by the knob 86b so that the position of the tab 86a is proportional to the weight of the glass in pounds per gob. Thus, the signal on line 87 is effectively the product of the shear cuts per minute S and the weight per gob W. That product is supplied through operational amplifier 88 to line 90 which supplies the potential across the tapped resistor 92 which is shown as having 3 taps, 94, 96 and 98. The several taps may be selected by the movable switch contact 100 depending upon the number N of gobs per shear cut which are made by the machine. Thus, if the switch contact 100 is connected to the tap 94 then the potential on line 102 is that required when the gob per shear cut is equal to 1, then the taps 96 and 98 are for 2 and 3 gobs per shear cut, respectively.

The signal on line 102 to operational amplifier 104 is then representative of the weight in pounds of glass per minute supplied by the machine. That signal is compared with the signal $+M_o$ on line 105 which is the nominal glass flow rate in pounds per minute and is supplied from an external source such as from the manually adjusted tap 106a of potentiometer 106 which is supplied from a potential source $+E$.

The output of amplifier 104 on line 108 is then related to the deviation of the mass flow rate of glass from its nominal value and that signal is usesd to supply the potentiometer slidewire 110 whose contact 110a is adjusted by the knob 110b so that the adjustment is proportional to the constant $G_m$ which represents the static pressure per unit of glass flow. $G_m$ is then the gain adjustment provided for the signal $P_m$ on line 72 so that on a change of glass flow in the machine the parison temperature will tend to remain constant.

It will be necessary in determining $G_m$ to make a limited number of parison temperature measurements. Data is collected while the machine speed is varied above and below the normal machine speed in several steps each lasting about one-half hour. The pressure set point should be held at the value that yields the best quality container for the normal machine speed. To obtain $G_m$, the slope of the relationship between the parison temperature and the glass flow is divided by the previously determined slope of the relationship between the parison temperature and the static air pressure in the main duct.

It will be evident to those skilled in the art that the circuit of the figure is only one configuration which may be used to carry out the computation $$P_m = G_m(NWS - M_o).$$

What is claimed is:

1. A control system for maintaining a constant temperature for the parisons formed in a glass forming machine where the parisons are subject to air cooling by the blowing of cooling air from a duct onto the mold for the parisons, comprising:

means for changing the pressure of the cooling air in the duct, means for measuring the pressure of the cooling air in said duct, control means operable in response to the deviation of said pressure measurement from a set point value to control said pressure by controlling the operation of said first named means, means for measuring the temperature of said cooling air, and means responsive to changes in said temperature measurement for directly varying the deviation to which said control means is responsive so as to cause said control means to vary the pressure in said duct to maintain a substantially constant temperature for said parisons as said temperature of said cooling air changes.

2. A control system as set forth in claim 1 which includes means responsive to the deviation of the mass flow rate of glass in the form of parisons from the nominal valuae for said rate for compensating said control means so that said control means will anticipate the change in heat transfer equilibrium resulting from said change in mass flow rate so as to maintain a constant temperature for said parisons as said mass flow rate changes.

* * * * *